United States Patent
Lalet et al.

[15] 3,666,734
[45] May 30, 1972

[54] COPOLYMERS OF VINYL CHLORIDE AND TERPENES

[72] Inventors: Philippe Lalet, Orthez; Guy Tsouladze, Paris, both of France

[73] Assignee: Societe Anonyme dite: Societe Nationale Des Petroles D'Aquitaine, Courbevoie, France

[22] Filed: Sept. 16, 1969

[21] Appl. No.: 858,535

[30] Foreign Application Priority Data

Sept. 18, 1968 France..................................166677

[52] U.S. Cl. ........................260/87.5 D, 260/807.8, 260/78
[51] Int. Cl. ..........................................................C08f 3/00
[58] Field of Search .......................260/87.5, 87.5 C, 87.5 D

[56] References Cited

UNITED STATES PATENTS 2,354,775   9/1944   Rummelsburg.......................260/87.5

OTHER PUBLICATIONS

Smith; W. M., Vinyl Resins, Reinhold Publishing Corporation, New York, New York 1958, pp. 99–100.

Primary Examiner—Joseph L. Schofer
Assistant Examiner—John A. Donahue, Jr.
Attorney—Milton J. Wayne

[57] ABSTRACT

New vinyl resins of improved characteristics are prepared by polymerizing vinyl chloride in the presence of bicyclic terpenes.

7 Claims, No Drawings

COPOLYMERS OF VINYL CHLORIDE AND TERPENES

The present invention relates to new vinyl resins which are obtained by copolymerizing vinyl chloride with certain terpenes, or with mixtures of these terpenes with other monomers. It is also concerned with the polymerization processes used for preparing these new copolymers.

The vinyl chloride resins available up to the present time have properties enabling them to be used in numerous fields. However, their thermal stability and capability of flow are poor. They are therefore unsuitable for certain applications.

Attempts have been made to overcome these disadvantages by incorporating plasticizers or stabilizers in resins based on vinyl chloride homopolymers, or by preparing homopolymers of low molecular weight, or even by copolymerizing vinyl chloride with other vinyl monomers, such as vinyl acetate, alkyl acrylates, dialkyl fumarates or alkyl-vinyl-ethers. These procedures may make it possible to improve one or other of the defective properties, but they have an unfavorable influence on the other properties.

It is one object of the present invention to provide new copolymers of vinyl chloride which have improved properties, particularly as compared with vinyl chloride homopolymers prepared under the same conditions as the conditions under which the copolymers of the invention are prepared. The improvements which the invention makes it possible to secure relate principally to the characteristics of thermal stability, fluidity and workability, and the invention makes it possible to secure these improvements without the other properties being unfavorably modified. This enables the fields of application of resins based on vinyl chloride to be greatly extended. Furthermore, the use of certain terpenes, such as $\beta$-pinene, is particularly recommended in the food packaging field.

The invention is also concerned with processes for preparing the above-mentioned improved copolymers.

In U.S. Pat. No. 2,616,880, it is proposed to polymerize vinyl chloride and to add terpenes when the polymerization has already reached a certain degree of conversion (of the order of 60 percent). These terpenes are trienic and acyclic terpenes, such as myrcene, allocimene and ocimene, the function of which is to stop the polymerization. Such terpenes, which inhibit polymerization, are unsuitable for carrying out the present invention. The terpenes which are used in carrying out the process of the present invention are added at the commencement of polymerization and must be substantially fixed on the vinyl chloride-base polymer.

It has been found that only certain terpenes are capable of copolymerizing with vinyl chloride without inhibiting polymerization. These terpenes are bicyclic terpenes having a single double bond, being of formula $C_{10}H_{16}$.

The copolymers according to the present invention are thus obtained by the polymerization of vinyl chloride in the presence of bicyclic terpenes. These terpenes can be used by themselves or in admixture with other monomers.

In the polymer which is formed, the vinyl chloride is predominant, the content of vinyl chloride generally being greater than 80 percent by weight of the copolymer and preferably 90 percent or more. In practice, the products which permit the most valuable uses contain 0.05 to 2 percent by weight of terpenes with respect to the copolymer as a whole.

In the process according to the present invention, the vinyl chloride is polymerized in the presence of bicyclic terpenes, such as $\beta$-pinene, camphene, $\alpha$-pinene, bornylene and sabinene. However, preference is given to $\beta$-pinene, the reactivity of which is better, and this permits wider uses and particularly use in connection with the packaging of food.

According to one optional feature of the invention, vinyl chloride can be polymerized with a mixture of bicyclic terpenes such as, for example, the mixture constituted by terebenthine oil, which contains various terpenes, namely $\alpha$-pinene and $\beta$-pinene, as well as camphene.

According to another optional feature of the invention, vinyl chloride can be polymerized with a mixture of monomers comprising at least one bicyclic terpene and some other vinyl monomer or monomers, such as some other vinyl halide, for example, vinylidene chloride, a vinyl ester, such as vinyl acetate, acrylate or methacrylate, an aromatic vinyl monomer, for example styrene, a monoolefin such as propylene, a vinyl ether, or a vinyl cyanide, such as acrylonitrile.

In carrying out the polymerization process in accordance with the invention, the terpenes are in a minor proportion in the reaction mixture, with respect to the vinyl chloride. Generally speaking a maximum of 10 percent of terpenes is used with 90 percent of vinyl chloride, and preferably less than 2 percent of terpenes. The process can be carried into effect in accordance with the usual techniques used with regard to the polymerization of vinyl chloride.

The reaction can be carried out in bulk, in solution or in emulsion, and also in suspension.

It is preferred to use a polymerization process in aqueous suspension. One of the desirable features of the invention is that it makes it possible to prepare improved copolymers with a good yield by a process which does not necessitate the use of high pressure and high temperature and which consequently can be effected without any difficulty with conventional polymerization equipment. The copolymers of the invention can be prepared by using pressures lower than 20 atmospheres and temperatures which are generally between 30° and 80° C. The pressure is preferably between 4 and 14 atmospheres and the temperature between 40° and 70° C.

The most convenient procedure for carrying out the process according to the present invention consists in polymerizing the monomers in aqueous suspension under the temperature and pressure conditions indicated above, in the presence of free radical catalysts, surface-active agents, suspension-forming agents and, in certain cases, a buffering agent.

Among the suspension-forming agents which may be used, mention may be made of, for example, polyvinyl alcohol, methyl cellulose and hydroxypropyl cellulose.

Sulphonates or sulphosuccinates can be used as surface-active agents.

It is also possible to add a buffering agent such as, for example, disodium phosphate or sodium acetate.

The catalysts which are used may be peroxides or peresters; as examples, the following catalysts can be mentioned: lauroyl peroxide, benzoyl peroxide, azo-bis-iso-butyronitrile, alkyl perpivalates, sulphonyl-acetylcyclo-hexane, chloro-benzoyl peroxide, alkyl peroxydicarbonates or combinations of these catalysts with one another or with other free radical catalysts.

When carrying out the polymerization, it is usual to prepare firstly a solution of the surface-active agent or agents and of the suspension-forming agent or agents, and then if desired a buffering agent is dissolved. The polymerization vessel is then charged with the solution and thereafter, after having vented the vessel, the monomers are introduced.

All the vinyl chloride can be added on starting the reaction or it is possible for it to be added during the progress of the reaction in a continuous or intermittent manner, while regulating the introduction thereof in such a way that monomeric vinyl chloride is always present in the reaction vessel.

The polymerization can also be carried out in two stages, the first stage being effected at a polymerization temperature lower than that of the second stage.

It is also possible to carry out the polymerization while causing the temperature to rise progressively, instead of maintaining it at one or more predetermined fixed values.

The products provided by the present invention and particularly the products obtained by the processes described above have improved properties which make them capable of being used in numerous industrial fields. As examples, it is possible to mention: the manufacture of hollow bodies by extrusion, rigid, semi-rigid and flexible films, elements by injection, floor-covering tiles, and polymeric plasticizers for polyvinyl chloride materials of high molecular weight.

The examples which follow are given in order to enable the invention to be better understood and they do not in any way limit the invention, the scope of which is determined by the appended claims.

EXAMPLE I

Into a 160-liter reaction vessel consisting of glass-lined steel are successively introduced: 80 kg of demineralized water, 3 liters of an aqueous solution containing 25 g/l of polyvinyl alcohol having a degree of saponification of 80 percent and a viscosity of 35 centipoises when measured in 4 percent solution in water at 20° C, 70 g of lauroyl peroxide and 50 g of β-pinene (0.1 percent, relatively to the vinyl chloride to be used). The vessel is closed and the stirrer mechanism is set in operation at a speed of 220 r.p.m. A vacuum is established and then 45 kg of vinyl chloride are introduced. The temperature of the suspension contained in the reactor is raised to 64° C. The pressure is kept in the region of 10 atmospheres.

After a reaction period of 8 hours, a white powder is obtained with a yield of 80 percent. It is dried at 80° C for one hour in a fluidized bed apparatus.

The product obtained has the following characteristics:
K-value : 55
fluidity at 150° C : 2.70 kg/cm$^2$
The thermal stability is outstanding.

EXAMPLE II

Under the same working conditions as in Example I, 225 g of β-pinene (0.5 percent of monomer with respect to the vinyl chloride) are introduced. A PVC material with a K-value of 48 is obtained, said PVC material having a good thermal stability and an excellent fluidity.

EXAMPLE III

Under the same working conditions as in Example I, 500 g of β-pinene are introduced and a polymer with a K-value of 45 is obtained.

EXAMPLE IV

Under the same working conditions as in Example I, 2 percent of β-pinene relatively to the vinyl chloride are introduced. A product with an ISO index of 26 is obtained. The [ISO index represents: (relative viscosity -1) × 100].

EXAMPLES V, VI AND VII

In a series of tests carried out under the same conditions as in Example I, the β-pinene is replaced by α-pinene, of which the percentage relatively to the vinyl chloride is indicated in the following table:

| Example | V | VI | VII |
|---|---|---|---|
| % α-pinene | 0.5 | 1 | 2 |
| K-value | 53 | 51 | 47 |

We claim:

1. A copolymer of vinyl chloride and at least one bicyclic terpene, wherein the terpene content of the copolymer product does not exceed 2 percent, and the K-value of the copolymer product is at least 35.

2. A copolymer according to claim 1 wherein said bicyclic terpene is β-pinene.

3. A copolymer according to claim 1, wherein the terpene content of the copolymer product is between 0.05 and 2 percent.

4. A copolymer according to claim 1, wherein the K-value of the copolymer product is between 45 and 55.

5. A process for the preparation of a vinyl chloride copolymer according to claim 11, wherein vinyl chloride is polymerized in the presence of between 0.05 to 2 percent of at least one bicyclic terpene.

6. A process according to claim 5 wherein the polymerization is carried out in aqueous suspension at a temperature between 30° and 80° C and at a pressure lower than 20 atmospheres.

7. A process according to claim 5 wherein the polymerization is conducted in the presence of a free catalyst.

* * * * *

UNITED STATES PATENT OFFICE
CERTIFICATE OF CORRECTION

Patent No. 3,666,734      Dated May 30, 1972

Inventor(s) Philippe Lalet and Guy Tsouladze

It is certified that error appears in the above-identified patent and that said Letters Patent are hereby corrected as shown below:

Claim 5, line 2, replace "claim 11" by --claim 1--.

Signed and sealed this 20th day of March 1973.

(SEAL)
Attest:

EDWARD M. FLETCHER, JR.
Attesting Officer

ROBERT GOTTSCHALK
Commissioner of Patents